US008661923B1

(12) United States Patent
Willett et al.

(10) Patent No.: US 8,661,923 B1
(45) Date of Patent: Mar. 4, 2014

(54) HIGH-TEMPERATURE SENSOR INTERFACE AND NETWORK

(75) Inventors: Michael Willett, Fairlawn, OH (US); Greg Shaw, Shaker Heights, OH (US)

(73) Assignee: Orbital Research Inc., Cleveland, OH (US)

( * ) Notice: Subject to any disclaimer, the term of this patent is extended or adjusted under 35 U.S.C. 154(b) by 0 days.

(21) Appl. No.: 13/445,165

(22) Filed: Apr. 12, 2012

Related U.S. Application Data (62) Division of application No. 12/220,874, filed on Jul. 29, 2008, now Pat. No. 8,176,803.

(51) Int. Cl.
*G01D 3/036* (2006.01)
*G01D 21/02* (2006.01)

(52) U.S. Cl.
CPC .............. *G01D 3/0365* (2013.01); *G01D 21/02* (2013.01)
USPC ............................. 73/866.1; 73/766; 374/142

(58) Field of Classification Search
CPC ..... G01D 3/028; G01D 3/036; G01D 3/0365; G01D 21/02
USPC ...................... 73/1.01, 204.19, 497, 708, 766, 73/861.01–861.03, 866.1; 340/870.01; 374/1, 142, E1.023; 702/1, 104, 127, 702/189, FOR. 158
See application file for complete search history.

(56) References Cited

U.S. PATENT DOCUMENTS

| | | | | |
|---|---|---|---|---|
| 6,013,108 | A * | 1/2000 | Karolys et al. | 702/189 |
| 6,437,692 | B1 * | 8/2002 | Petite et al. | 340/870.01 X |
| 6,677,759 | B2 * | 1/2004 | Friel et al. | 324/430 |
| 7,026,926 | B1 * | 4/2006 | Walker, III | 340/539.11 |
| 7,269,527 | B1 * | 9/2007 | Frank | 702/104 X |
| 7,299,121 | B2 * | 11/2007 | Uruno et al. | 701/101 |
| 7,403,126 | B2 * | 7/2008 | Pedraza et al. | 340/604 |
| 7,907,052 | B2 * | 3/2011 | Delaney, Jr. | 340/539.11 |
| 2005/0104176 | A1 * | 5/2005 | Rodney et al. | 257/678 |
| 2007/0162235 | A1 * | 7/2007 | Zhan et al. | 702/1 X |
| 2007/0186668 | A1 * | 8/2007 | Garverick et al. | 73/780 |
| 2008/0078228 | A1 * | 4/2008 | Nies | 73/1.01 |
| 2011/0015886 | A1 * | 1/2011 | Frank | 702/104 X |

* cited by examiner

*Primary Examiner* — Thomas P Noland
(74) *Attorney, Agent, or Firm* — Brian M. Kolkowski; Robert Knecht Schmidt (57) ABSTRACT

The present invention is a sensor interface or network of interfaces that utilizes high-temperature electronics to operate at elevated temperatures for applications that include but are not limited to aircraft and automobile engines, vehicle frames, refineries, nuclear and chemical production plants, and in downhole drilling for petroleum and natural gas. The interface or network provide connectors for a variety of sensors with analog and digital outputs, and can in turn provide data to an automated electronic control system or a monitor. Because the sensor interface may be placed in so-called "hot zones" nearer to the sensors being monitored than other systems that use conventional electronics, the sensor interface can increase noise immunity, increase reliability, decrease cost, reduce weight, and increase space.

13 Claims, 8 Drawing Sheets

HIGH-TEMPERATURE SENSOR INTERFACE AND NETWORK

CROSS-REFERENCE TO RELATED APPLICATIONS

This application is a divisional application of U.S. patent application Ser. No. 12/220,874, filed Jul. 29, 2008.

LICENSE RIGHTS-FEDERAL SPONSORED

The U.S. Government has a paid-up license in this invention and the right in limited circumstances to require the patent owner to license others on reasonable terms provided for by the terms of contract numbers N68335-05-C-0160 and N08335-06-C-0273 awarded by the United States Navy.

BACKGROUND OF THE INVENTION

1. Field of the Invention

The present invention relates to electronic sensor systems, electronics and networks capable of operating in high-temperature environments.

2. Technical Background

A number of systems that require or benefit from automated electronic monitoring or control operate at elevated temperatures. Examples of such systems include the engines of aircraft and automobiles, vehicle frames, refineries, nuclear and chemical plants, and in downhole drilling for petroleum, natural gas and the like. Elevated temperatures can create inhospitable environments for the electronics associated with sensors used in control and monitoring systems because the bandgap of semiconductor materials decreases as a function of temperature, resulting in performance degradation at higher temperatures. Conventional electronics fabricated in bulk silicon typically have an upper temperature limit of about 70° C., or 125° C. for military applications. Elevated-temperature systems that use conventional electronics typically do so by packaging the electronics with heat sinks or active cooling devices, which add weight and increase system complexity, or by distancing the electronic components from "hot zones" (i.e., high-temperature regions) where sensors reside by adding cabling between sensors and their associated electronics, which both adds weight and can add noise to signals obtained from sensors.

In many modern aircraft, and particularly in military aircraft, engine parameters are monitored and engine controls are adjusted by a full authority digital engine control (FADEC) system. Typically built into an enclosure roughly the size of a shoebox, a FADEC is a computerized unit with sensor inputs and actuator outputs that works to govern engine fuel flow, variable engine geometrics and various other controls to ensure the performance, safety and efficiency of the propulsion unit. A FADEC eliminates direct mechanical linkages between pilot controls (e.g., the throttle) and an engine, and in doing so, achieves more optimal performance in all phases of flight while taking into account the operational limits of the engines in order to reduce the probability of failure. On military aircraft, FADECs also protect against electromagnetic radiation after a nuclear explosion or the like by quickly switching off electronic control systems upon the detection of radiation. As with all aircraft parts, it is desirable that a FADEC be lightweight, but some FADECs for civil applications can weigh as much as 27 kg. Military FADECs typically weigh no more than 13 kg. The temperature-dependent reliability of electronic components contained within a FADEC, such as microprocessors, means that FADECs must be mounted away from hot zones on aircraft propulsion systems and often must be supported by costly, heavy, and expensive cooling systems.

It is therefore the object of the present invention to provide a sensor interface that would act as an intermediary between inputs (e.g., sensors) and the electronic control system accepting those inputs and supplying output signals (e.g., to actuators and switches), or that would act as an intermediary between inputs and a monitor. It is further an object of the present invention to provide a sensor interface that permits its placement in hot zones closer to the sensors with which it would interface. It is further an object of the present invention to provide a sensor interface or network that provides the benefits of increased noise immunity, increased reliability, decreased cost, reduced weight, and reduced space required in automated systems.

SUMMARY OF THE INVENTION

The present invention relates to sensor interfaces or networks for operation in high temperature environments, and for use of these interfaces or networks for automated electronic control systems. More particularly, the invention relates to sensor interfaces capable of operating in elevated-temperature environments. Even more particularly, the invention relates to high-temperature sensor interfaces capable of interfacing with numerous types of sensors capable of measuring a diversity of parameters and providing different protocol varieties and voltage ranges of sensor signals. The invention further relates to networks of sensor interfaces that communicate data along a common signal pathway using a defined communications protocol.

A major objective of the invention is to provide a sensor interface capable of connecting to any of the variety of different sensors that may be used in the intended high-temperature applications. A number of sensors are easily interfaced and widely used in control of elevated-temperature systems. These include linear variable differential transformers (LVDTs), used for measuring linear displacement; resolvers, used for measuring rotary displacement; thermocouples, used for measuring temperature differences; sensors to determine engine speed; various sensors used to determine airspeed, such as Pitot tubes; resistance temperature detectors (RTDs), used to measure absolute temperatures; strain gauges, used to measure mechanical strains and pressures; and various other analog electrical sensors. Many sensors are often used in elevated-temperature system controls, but are not easily interfaced. These include vibration sensors, which may be based on accelerometers, piezo-electric elements, optical elements, etc.; oil level sensors, which rely on small values of capacitance to detect oil level; and 2-wire VDT sensors. Some sensors are difficult to interface and are seldom used. Such sensors include flame-out/light-off detectors, which require high voltage excitation signals and are placed in areas of high temperatures that even elevated-temperature electronics cannot withstand; oil debris monitors, which have high-voltage outputs and high-frequency carrier signals; and eddy current sensors, which rely on a complicated signal pathway for signal acquisition and conditioning. Various of these sensors require or benefit from periodic recalibration that can be performed manually or automatically.

In a number of embodiments, the sensor interface of the present invention comprises at least one sensor connector for connecting a sensor having an analog signal, a microprocessor capable of operating at temperatures greater than at least 135° C. and at clock speeds of at least 8 MHz for modifying and digitally converting the analog signal, and a communication device for transmitting the modified and digitally converted signal to a receiving device. The sensor connector may be designed to interface with a particular sensor, or may be a generic sensor connector capable of interfacing with numerous types of available sensors. Preferably, the microprocessor is fabricated using any of the high-temperature electronics fabrication methods known in the art, for example, using wide-bandgap materials or SOI. A previously-designed, commercially-available part may be used for the microprocessor, for example, the C166, the XAP4, or the LEON3. Preferably, the microprocessor is an application-specific integrated circuit (ASIC) advantageously custom-designed to reduce parts count in the sensor interface. The communication device may comprise wires or may be wireless. Preferably, the communication device uses a controller area network (CAN) specification. Preferably, the specification used is the SAE J1939 vehicle bus standard, hereby incorporated by reference. The communication protocols can also be EIA-422, EIA-485, IEEE 1394 (Firewire), or IEEE 802.3 (Ethernet), also hereby incorporated by reference. Other communication protocols and methods such as fiber optic schemes and wireless schemes may also be advantageously adopted. The receiving device may be an automated electronic control system, such as a FADEC, or may be a monitor.

In other embodiments, the sensor interface of the present invention comprises at least one sensor connector for connecting one of at least two different types of sensors having analog signals, one or more electrical components capable of operating at temperatures greater than at least 135° C. for analyzing and digitally converting the analog signal of either of the at least two different types of sensors, a non-volatile memory for storing data, and a communication device for transmitting the modified and digitally converted signal to a receiving device. The non-volatile memory may be used for buffering data processed from the sensors and for recording a usage history, advantageously enabling prognostics and health management (PHM) and/or integrated system health management (ISHM) to aid in the maintenance of the system into which the present invention is integrated. Condition-based maintenance (CBM) may also be advantageously enabled.

In yet other embodiments, the sensor interface comprises at least one sensor connector for connecting one of at least two different types of sensors having analog signals, one or more electrical components capable of operating at temperatures greater than at least 135° C. and capable of being reprogrammed for analyzing and digitally converting the analog signal of at least one of the at least two different types of sensors, and a communication device for transmitting the modified and digitally converted signal to a receiving device.

In yet other embodiments, the sensor interface comprises at least one sensor connector for connecting one of at least two different types of sensors having analog signals, one or more electrical components capable of operating at temperatures greater than at least 135° C. for analyzing and digitally converting the analog signal of at least one of the at least two different types of sensors and for re-calibrating at least one of the at least two different types of sensors, and a communication device for transmitting the modified and digitally converted signal to a receiving device.

In yet another embodiment, the present invention is a sensor network comprising at least two sensors having analog signals and at least two sensor interfaces each comprising at least one sensor connector for connecting at least one of the at least two sensors having analog signals, one or more electrical components capable of operating at temperatures greater than at least 135° C. for analyzing and digitally converting the analog signal of at least one sensor, a communication device for transmitting the modified and digitally converted signal, and a common communication pathway for transmitting the modified and digitally converted signals from both of the at least two sensors.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED
EMBODIMENT(S)

The present invention relates to electronic sensor interfaces capable of operating at high temperatures. The present invention further relates to high-temperature sensor interfaces capable of converting analog signals to digital signals at appropriately high clock speeds. The present invention further relates to high-temperature sensor interfaces capable of communicating sensor information to electronic processing components that are not capable of operating at such high temperatures.

The preferred embodiments of the present invention include a sensor interface that is capable of operating at elevated temperatures. Broadly, a sensor interface comprises an electrical system that accepts at least one signal from at least one sensor through a sensor connector, modifies the signal, and outputs the modified signal for use by another system. In one embodiment, the sensor interface of the present invention outputs a modified analog signal. Advantageous modifications of a sensor signal can include frequency filtering, amplification, attenuation, analog-to-digital conversion, digital-to-analog conversion, pulse shaping, time delay shifting, formatting of digital data into packets for transmission by some defined transmission protocol, and so forth. Preferably, the signal modification performed by the sensor interface renders a sensor signal with less noise or with less other insignificant content, and provides a more robust output signal for improved transmission. For example, while an analog sensor signal may be disadvantageously attenuated and corrupted by noise during transmission, the same signal may be transmitted with improved corruption immunity if digitally converted and transmitted via a defined transmission protocol.

The sensor interface of the present invention preferably includes a universal sensor connector or set of fully integrated connectors capable of connecting to more than one type of sensor. Preferably, the universal sensor connector can connect to an LVDT, a resolver, a thermocouple, an engine speed sensor, an airspeed sensor, an RTD, a strain gauge or the like. More preferably, the universal sensor connector of the present invention can also connect to a vibration sensor, an oil level sensor, a 2-wire VDT sensor, or the like. Even more preferably, the universal sensor connector of the present invention can also connect to a flame-out/light-off detector, an oil debris monitor, an eddy current sensor, or the like. Preferably, the sensor interface is capable of being mounted as near as possible to the sensor or sensors to which it interfaces. In all embodiments, the sensor interface of the present invention can be connected to at least 1 sensor. Preferably, the sensor interface of the present invention can be connected to at least 2 sensors. More preferably, the sensor interface of the present invention can be connected to at least 5 sensors. Even more preferably, the sensor interface of the present invention can be connected to at least 8 sensors. Even more preferably, the sensor interface of the present invention can be connected to at least 16 sensors.

Preferably, the electronics of the sensor interface of the present invention are reprogrammable to handle different types of sensors and/or different sensor configurations. This programmability preferably utilizes adjustable filters and amplifiers with adjustable gains that can be modified by instructions programmed into the sensor interface. This programmability preferably further provides automatic adjustment of the sensor reading for detected environmental changes (e.g. temperature). This programmability preferably further includes the ability to enable algorithmic processing that can be performed on the signal acquired from the sensor to, for example, convert it to a unit expected by a controller or monitor (e.g., convert from units volts to units ° C. for a thermocouple or to units PSI for a pressure sensor). This programming may be conducted once during manufacture of the sensor interface, or may be conducted repeatedly as a maintenance, repurposing, or calibration measure either by human personnel or by an automatic control system.

In the preferred embodiments of the sensor interface of the present invention, the electronics of the sensor interface are fabricated using a high-temperature electronics fabrication process. The high-temperature electronics fabrication process may use semiconductor material with a wider bandgap than bulk silicon, or may use a technology that reduces leakage current at high temperatures by decreasing the junction area of the transistors, or by another method known in the art. Preferably, the electronics of the sensor interface of the present invention are fabricated using gallium arsenide (GaAs). More preferably, the electronics of the sensor interface of the present invention are fabricated using silicon carbide (SiC). Even more preferably, the electronics of the sensor interface of the present invention are fabricated using gallium nitride (GaN). Even more preferably, the electronics of the sensor interface of the present invention are fabricated using diamond. Even more preferably, the electronics of the sensor interface of the present invention are fabricated using silicon-on-insulator (SOI) technology.

In some embodiments of the sensor interface of the present invention, the digital electronic components are fabricated using the high-temperature processes described above, while the analog electronic components are fabricated using convention bulk silicon processes, advantageously reducing manufacturing cost.

Regardless of the material system choice, a preferred embodiment of the analog input portion of the device includes at least one differential input for accepting analog voltage or current signals from the attached sensors. More preferably the analog input portion of the device includes at least two differential inputs for accepting analog voltage or current signals from more than one sensor or from a sensor that requires more than one differential input, such as an LVDT.

In the preferred embodiments of the sensor interface of the present invention, the electronics of the sensor interface are fabricated using a high-temperature electronics fabrication process so as to be able to reliably operate at temperatures associated with hot zones of vehicles and other harsh environments. Preferably, the sensor interface of the present invention is capable of reliable operation at temperatures greater than at least 135° C. More preferably, the sensor interface of the present invention is capable of operation at temperatures greater than at least 150° C. Even more preferably, the sensor interface of the present invention is capable of operation at temperatures greater than at least 175° C. Even more preferably, the sensor interface of the present invention is capable of operation at temperatures greater than at least 190° C. Even more preferably, the sensor interface of the present invention is capable of operation at temperatures greater than at least 200° C. Even more preferably, the sensor interface of the present invention is capable of operation at temperatures greater than at least 275° C.

In the preferred embodiments of the sensor interface of the present invention, the electronics of the sensor interface include a digital clock that reliably provides regularly-timed pulses to govern the timing of the functioning of other electronic components within the sensor interface, e.g., the microprocessor. Preferably, the electronics of the present invention are capable of reliable high-temperature operation at a clock speed of more than about 8 MHz. More preferably, the electronics of the present invention are capable of reliable high-temperature operation at a clock speed of more than about 16 MHz. Even more preferably, the electronics of the present invention are capable of reliable high-temperature operation at a clock speed of more than about 32 MHz. Even more preferably, the electronics of the present invention are capable of reliable high-temperature operation at a clock speed of more than about 64 MHz. Even more preferably, the electronics of the present invention are capable of reliable high-temperature operation at a clock speed of more than about 125 MHz. Even more preferably, the electronics of the present invention are capable of reliable high-temperature operation at a clock speed of more than about 250 MHz. Even more preferably, the electronics of the present invention are capable of reliable high-temperature operation at a clock speed of more than about 500 MHz.

The electronics of the sensor interface of the present invention preferably include a temperature sensor capable of supplying to the electronics a measurement of the application temperature of the sensor interface for automatic sensor calibration. The temperature sensor can be any suitable temperature measurement device incorporated onto the sensor interface or may be separate therefrom. In one preferred embodiment the temperature sensor is based on a band gap reference that varies with temperature in a known fashion.

The sensor interface of the present invention is preferably packaged and/or built into an enclosure capable of being mounted in hot zones. Such hot zones may include the surfaces of engines of aircraft and land vehicles (cars, trucks, tanks, earth-moving and construction vehicles, etc.); on airframes of air and space vehicles and in particular along the leading edges of airframes where sensors are advantageously placed; on drills and pipes used in drilling and mining for resources such as minerals, petroleum, and natural gas; and within nuclear reactors and the reaction chambers, storage vessels and fluid transmission pipelines of chemical processing plants. Preferably, the electronics and enclosure of the sensor interface of the present invention are capable of reliable operation at temperatures of 135° C. in the fan area of a jet engine. More preferably, the electronics and enclosure of the sensor interface of the present invention are capable of reliable operation at temperatures of 200° C. in the core area of a jet engine. Even more preferably, the electronics and enclosure of the sensor interface of the present invention are capable of reliable operation at temperatures of 260° C. in the mounting area near the turbine exhaust of a jet engine. Turbine exhaust can reach temperatures 1090° C. at the location of the sensor probe. In some embodiments, the sensor interface enclosure may include a cooling system.

The sensor interface of the present invention is preferably built into an enclosure capable of being mounted areas of high vibration. Preferably, the electronics and enclosure of the sensor interface of the present invention are capable of reliable operation at vibrations of 60 g's at a frequency of 4,000 Hz, the amount of vibration typical of certain mounting points on the engine of a fighter jet. More preferably, the electronics and enclosure of the sensor interface of the present invention are capable of reliable operation at vibrations of 150 g's at a frequency of 7,500 Hz, the amount of vibration typical of other mounting points on the engine of a fighter jet. Even more preferably, the electronics and enclosure of the sensor interface of the present invention are capable of reliable operation at vibrations of 300 g's at a frequency of 10,000 Hz, the typical maximum amount of vibration of certain mounting points on the engine of a fighter jet.

The sensor interface of the present invention is preferably built into an enclosure capable of withstanding corrosion. The enclosure is preferably capable of withstanding exposure to salts and sulfur compounds, fuels, oils, soap and water, and combustion and incomplete combustion byproducts.

The electronics of the sensor interface of the present invention are preferably capable of surviving high amounts of electromagnetic interference and airborne radiation. Preferably, the electronics and enclosure of the sensor interface of the present invention meet the EMI requirements as defined in MIL-STD-461, hereby incorporated by reference. Preferably, the electronics and enclosure of the sensor interface of the present invention use accommodation strategies so as not to be susceptible to single event upset and/or latch-up.

The sensor interface of the present invention advantageously includes a number of electronic components for supplying excitation voltages, currents, and frequencies to sensors.

The sensor interface of the present invention advantageously includes a number of electronic components for the modification of sensor signals. Preferably, the sensor interface of the present invention includes an analog filter. Preferably, the sensor interface of the present invention includes at least one analog-to-digital converter. Preferably, the analog-to-digital convertors use sigma-delta modulation, or successive approximation, or some combination thereof, to perform the analog-to-digital conversion of sensor signals. Preferably, the sensor interface of the present invention includes one or more multiplexors to interleave signals from multiple sensor inputs. Preferably, the sensor interface of the present invention includes a digital microprocessor to modify sensor signals. Preferably, the sensor interface of the present invention includes a digital memory. Preferably, the sensor interface of the present invention includes a PROM for program storage. The sensor interface of the present invention may transmit modified signals that are either analog or digital. Preferably, the sensor interface of the present invention transmits digital signals. Preferably, the sensor interface of the present invention includes a controller for digital transmission by a protocol. Preferably, the protocol used is the CAN protocol. Preferably, the particular CAN protocol used is the SAE J1939 vehicle bus standard. The preferred embodiment realizes the electronics of the sensor interface in as few chips as the system can be fabricated with in order to reduce part count and lower cost. Preferably, the electronics are fabricated onto two ASIC chips. More preferably, these electronic components are fabricated onto a single ASIC chip. In certain embodiments, the sensor interface of the present invention preferably includes a signal transducer capable of transmitting output signals by means other than electronic transmission over electrical conductors. For example, the sensor interface may include a wireless transmitter for broadcast of output signals by radio waves or by electromagnetic induction, or may include an electro-optic transducer for transmission of output signals through optical fiber.

Another embodiment of the present invention is a network of high-temperature sensor interfaces. A network comprises at least two high-temperature sensor interfaces and a controller or monitor connected together. In certain embodiments, the controller is a FADEC. The connection may be physical, as by a bus of electrical wires or optical fiber, or may consist of some wireless transmission method. In certain embodiments, the connection is a CAN bus. The high-temperature sensor interfaces of the network are capable of unidirectional or bidirectional communication with the controller or monitor without destructive or distortive collision of data. The various embodiments of the network of the present invention may include any number of high-temperature sensor interfaces, and each high-temperature sensor interface may be connected to any number of sensors. Preferably, a network includes at least two high-temperature sensor interfaces, more preferably at least three, and most preferably at least four.

The following figures illustrate several preferred embodiments of the present invention.

Figure 1:
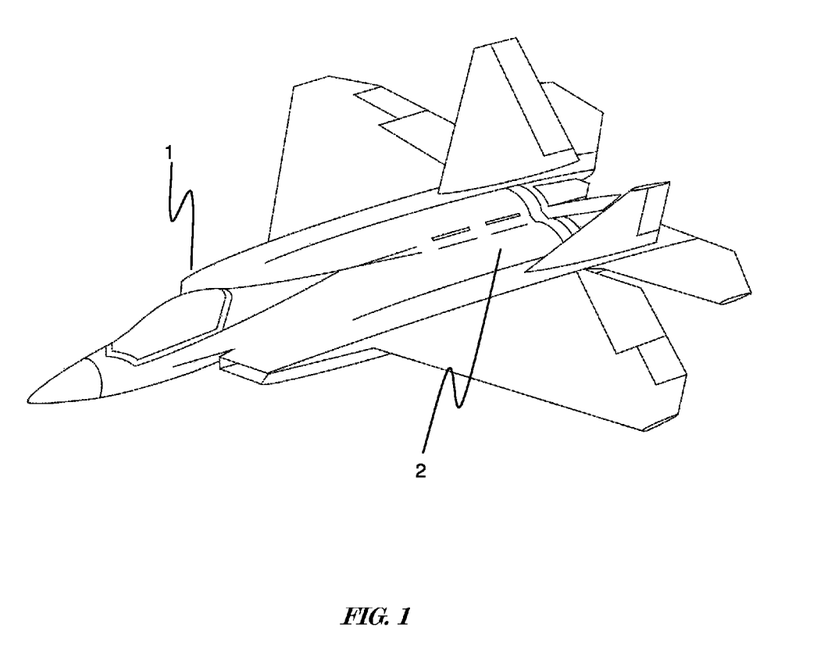
FIG. 1 Illustration of a fighter jet with location of propulsion system indicated.

FIG. 1 is a perspective view of a fighter jet 1 showing the region of its propulsion system 2 utilizing sensors and a sensor interface in the high temperature region about the jet's turbine (not shown).

Figure 2:
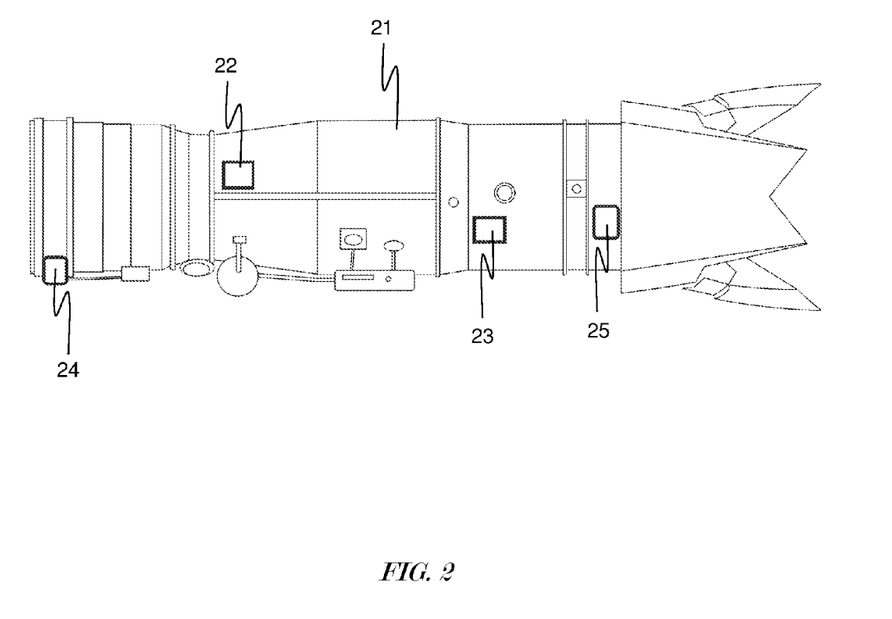
FIG. 2 Schematic view of a fighter jet engine with actuator, sensor, and FADEC positions indicated.
Figure 3:
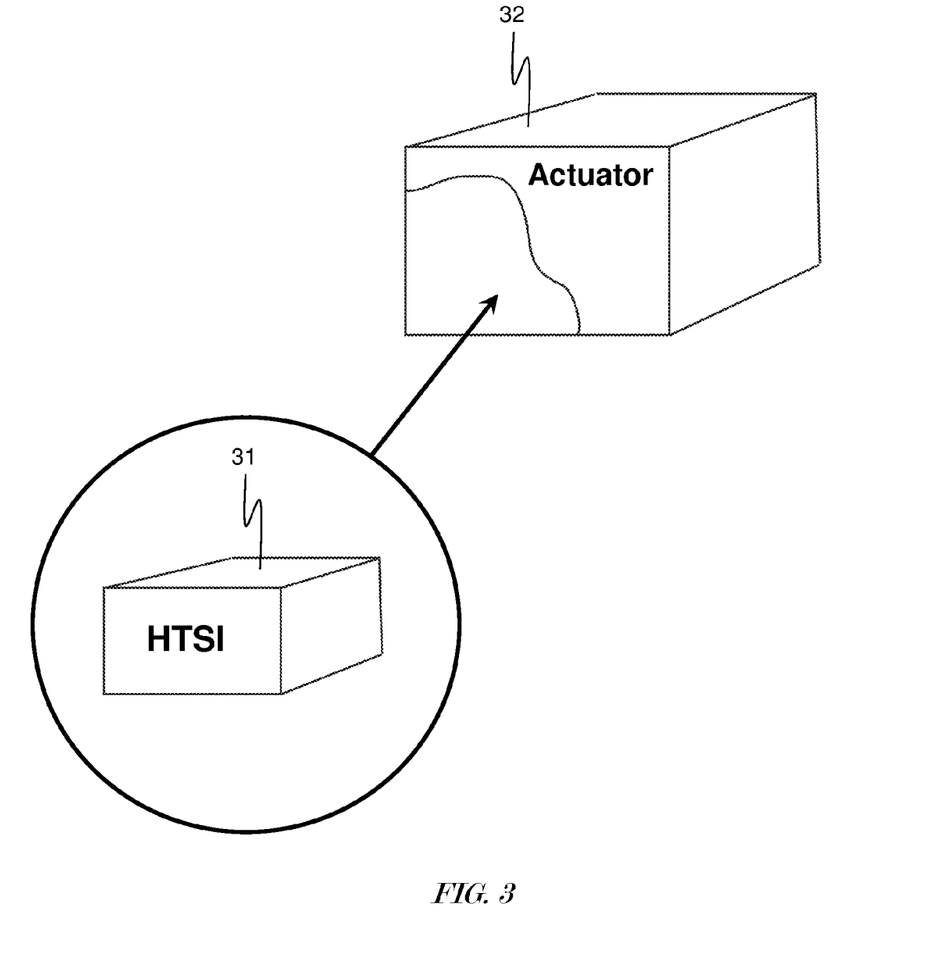
FIG. 3 Schematic illustration showing the incorporation of a high-temperature sensor interface into an actuator assembly.

FIG. 2 is a side view of the jet's turbine engine 21 of the propulsion system of fighter jet 1 of FIG. 1. Attached to the engine 21 are enclosures 22, 23, 24, 25 for a FADEC 22 and actuators 24, 25. The FADEC 22 sends control signals to the actuators 24, 25 via wires (not shown). The FADEC 22 is necessarily placed away from the hot zones of the engine, where temperatures are highest, but the actuators 24, 25 may reside on hot zones. In various embodiments of the present invention, a high-temperature sensor interface 31 may be built into the enclosure of an actuator 32, as shown in FIG. 3.

The high-temperature sensor interface 31 may also be built into a sensor enclosure (not shown) or may be mounted to a hot zone surface, such as on the engine 21 of FIG. 2, within its own enclosure 31.

Figure 4:
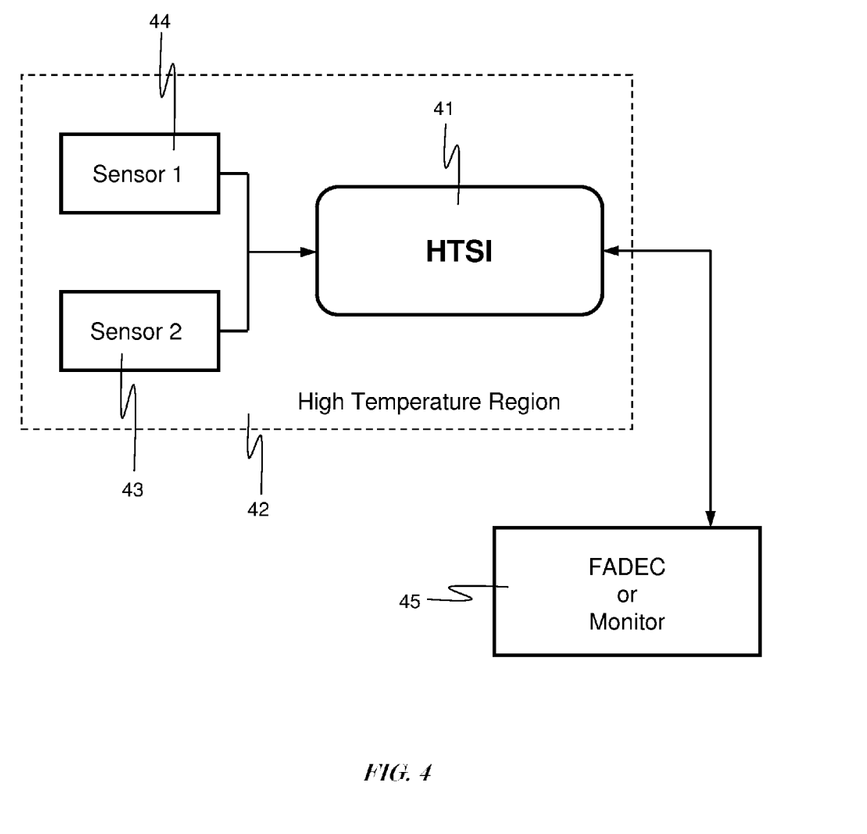
FIG. 4 Block diagram illustrating the use of a high-temperature sensor interface as a high-temperature region intermediary between sensors and control system or monitor.

FIG. 4 is a schematic showing the use of the high-temperature sensor interface 41 of the present invention as an intermediate between sensors 43, 44 and an automated control system or monitor 45. The interface 41 is capable of surviving elevated temperatures and can be placed in a hot zone 42, whereas the control system or monitor 45 must be placed outside of a hot zone.

Figure 5:
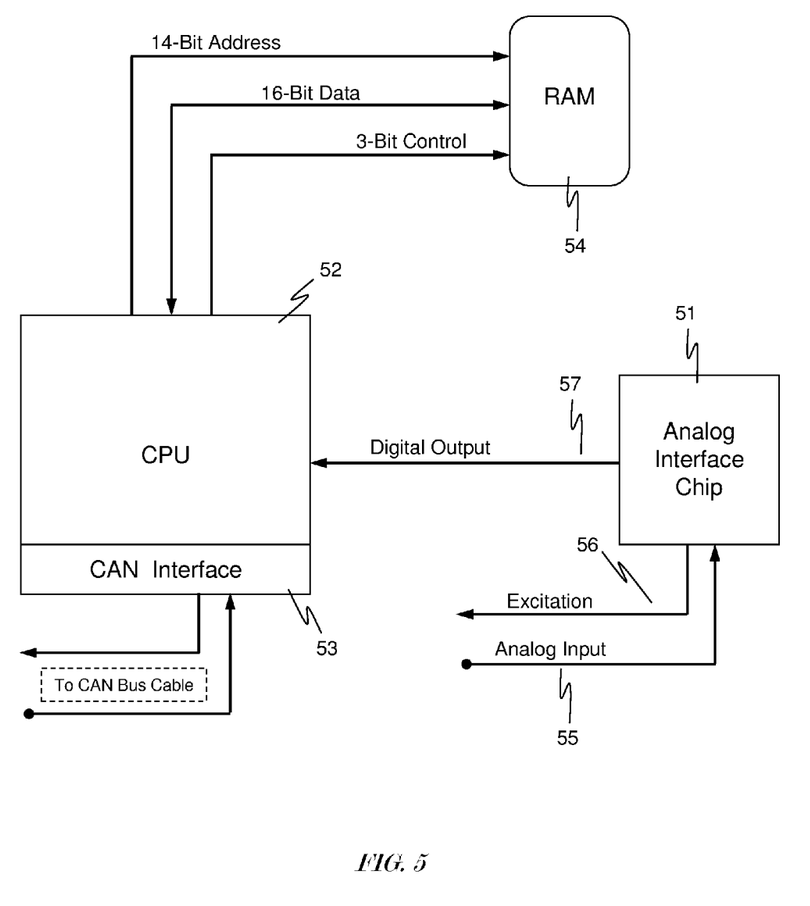
FIG. 5 Block diagram illustrating an embodiment of the invention that uses a separate microprocessor and analog interface chip.

The block diagram of FIG. 5 shows one embodiment of the high-temperature sensor interface of the present invention. One or more sensors (not shown) are connected to a sensor connector (not shown) which sends analog sensor signals along analog input lines 55, which feed into an analog interface chip 51. The analog interface chip 51 provides required excitation to the sensors, receives the analog sensor signals, performs any necessary analog amplification, and then digitizes the signal. The analog interface chip 51 is fabricated using high-temperature electronics. Preferably, the analog interface chip 51 is fabricated using SOI technology. The analog interface chip 51 provides excitation voltages, currents, and/or frequencies along excitation lines 56. This excitation is capable of providing power to attached sensors (not shown). The analog interface chip 51 conditions incoming sensor signals by filtering them and performing analog-to-digital conversion. It then sends the digital signals over a digital bus 57 to a digital processor 52. The digital processor 52 is fabricated also using high-temperature electronics. Preferably, the digital processor 52 is fabricated using SOI technology. In the illustrated embodiment, the processor's core has an integrated CAN interface 53 for two-way data communication with an automated control system or a monitor over a CAN bus cable (not shown). The processor 52 also communicates with a RAM 54 for process memory storage.

Figure 6:
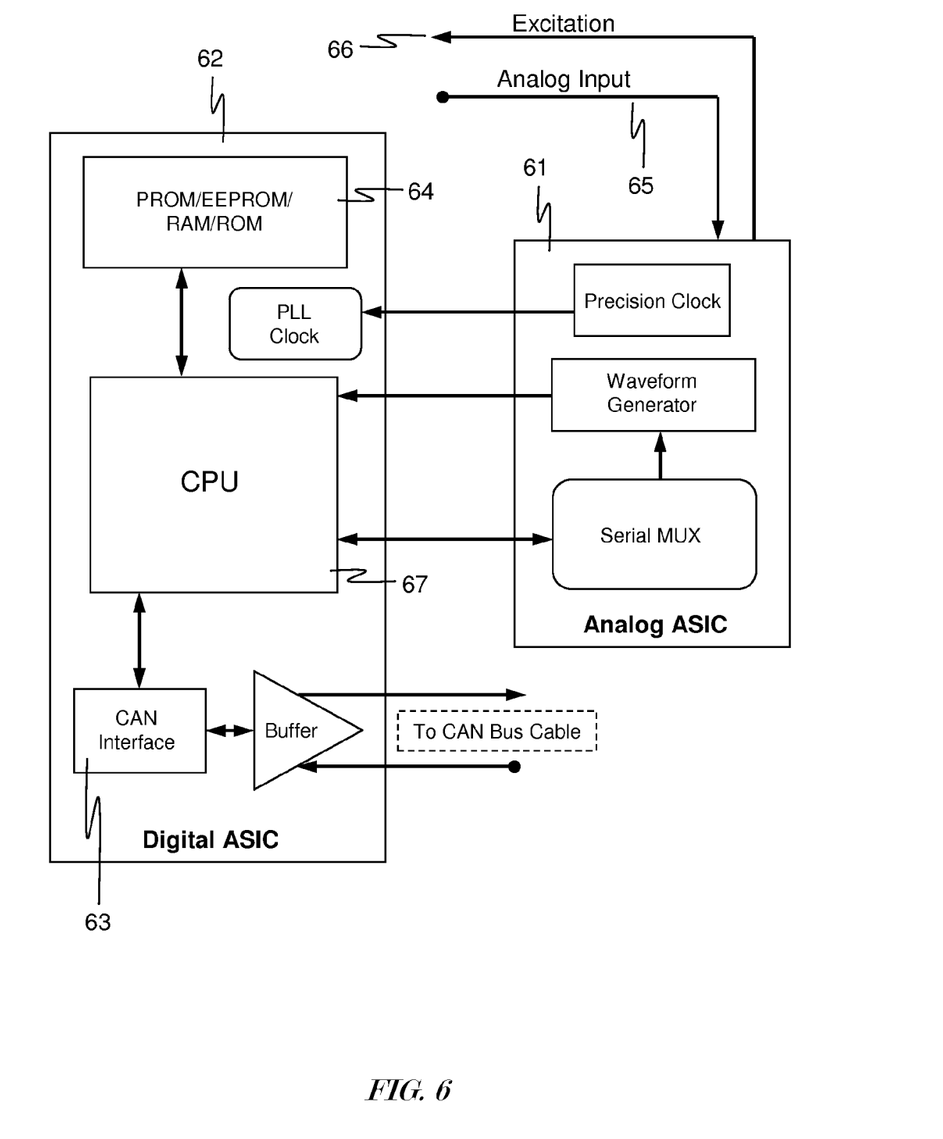
FIG. 6 Block diagram illustrating an embodiment of the invention that uses an analog ASIC and a digital ASIC.

The block diagram of FIG. 6 shows another embodiment of the high-temperature sensor interface of the present invention. One or more sensors (not shown) are connected to a sensor connector (not shown) which sends analog sensor signals along analog input lines 65, which feed into an analog ASIC 61. The analog ASIC is fabricated using high-temperature electronics. Preferably, the analog ASIC 61 is fabricated using SOI technology. The analog ASIC 61 also provides excitation voltages along excitation lines 66. These excitation voltages are capable of providing power to attached sensors (not shown). The analog ASIC 61, which includes the DAC, ADC, and amplifiers, conditions incoming sensor signals by filtering them and performing analog-to-digital conversion. The digital signal is then sent to a digital ASIC 62. The digital ASIC 61 is fabricated using high-temperature electronics. Preferably, the digital ASIC 62 is fabricated using SOI technology. In the illustrated embodiment, the digital ASIC has a built-in microcontroller 67, memory 64, and communications interface 63 for two-way data communication with an automated control system or a monitor over a CAN bus cable (not shown). The two-ASIC design illustrated in FIG. 6 reduces parts count and cost over the multi-chip design of FIG. 5.

Figure 7:
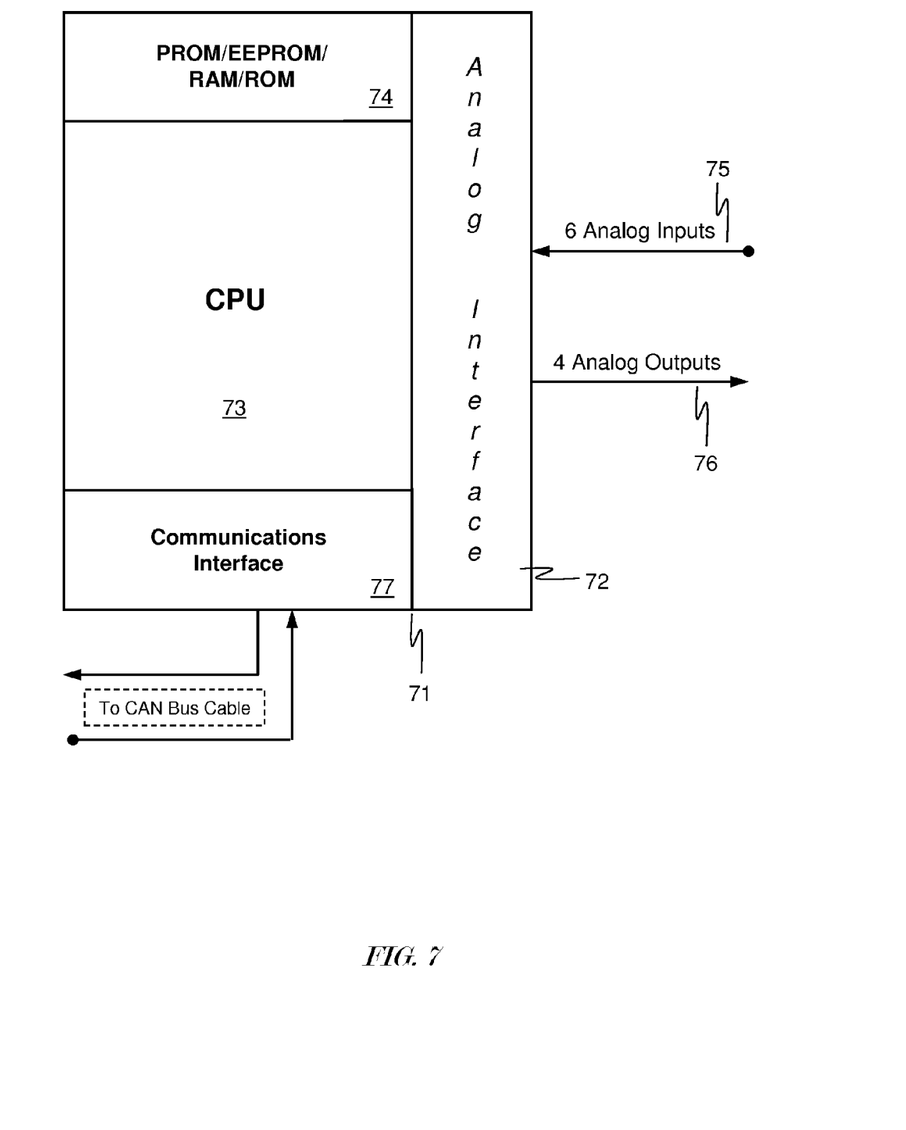
FIG. 7 Block diagram illustrating an embodiment of the invention that uses a mixed-signal ASIC combining the analog and digital electronics onto a single chip.

The block diagram of FIG. 7 shows yet another embodiment of the high-temperature sensor interface of the present invention. One or more sensors (not shown) are connected to a sensor connector (not shown) which sends analog sensor signals along analog input lines 75, which feed into a mixed-signal ASIC 71. The mixed-signal ASIC 71 is designed to provide all the functionality of both the analog ASIC 61 and the digital ASIC 61 of FIG. 6. The mixed-signal ASIC 71 is fabricated using high-temperature electronics. Preferably, the mixed-signal ASIC 71 is fabricated using SOI technology. In order to drive connected sensors, the mixed-signal ASIC 71 also provides excitation voltages along excitation lines 76. These excitation signals are capable of providing power to attached sensors (not shown). The mixed-signal ASIC 71 includes an analog interface portion 72 that conditions incoming sensor signals by filtering them and performing analog-to-digital conversion. It then sends digital signals to the CPU portion 73 of the mixed-signal ASIC 71, which utilizes a built-in memory 74 and built-in communications interface 77 for two-way data communication with an automated control system or a monitor over a CAN bus cable (not shown). The single-ASIC design illustrated in FIG. 7 reduces parts count and cost over the two-ASIC design of FIG. 6.

Figure 8:
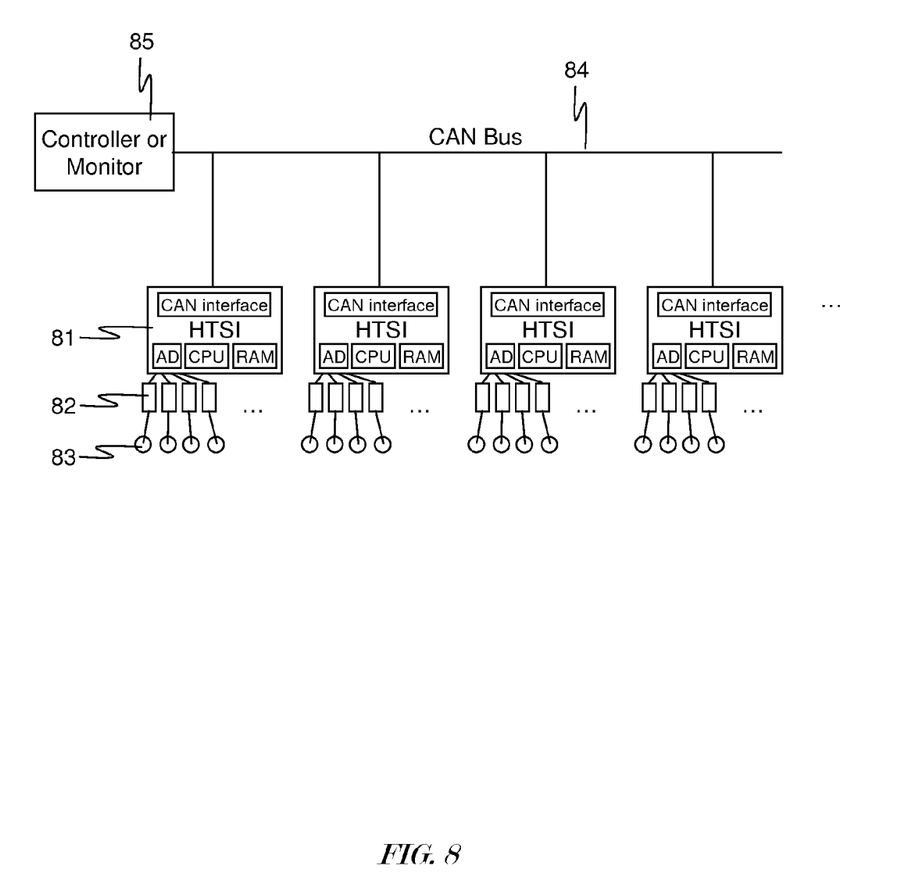
FIG. 8 Block diagram illustrating an embodiment of the invention as a network of high-temperature sensor interfaces connected via a single controller area network bus.

The block diagram of FIG. 8 shows an embodiment of the invention as a sensor network of high-temperature sensor interfaces 81. Sensors 83 are connected to the sensor connectors 82 of the invention. The sensor connectors 82 are preferably universal sensor connectors capable of interfacing with many kinds of sensors. The number of sensors 83 connected to a high-temperature sensor interface 81 is limited only by the number of analog inputs designed into the interface 81; the interface 81 may conceivably be designed to accommodate any number of sensors 81 and would therefore have enough sensor connectors 82 to connect the appropriate number of sensors 83. The sensors 83 communicate analog signals to the high-temperature sensor interfaces 81 through the sensor connectors 82. The high-temperature sensor interfaces 81 comprise electronics fabricated using high-temperature electronics inside enclosures. Preferably, the electronics are fabricated using SOI technology. The high-temperature sensor interfaces 81 may be of any of the designs illustrated in FIG. 5, FIG. 6, or FIG. 7, or of any similar design that would be apparent to a person skilled in the art. The high-temperature sensor interfaces 81 digitally convert the analog signals and process them. Multiple high-temperature sensor interfaces 81 are connected on a common communication pathway 84 for transmitting the modified and digitally converted sensor signals. Preferably, common communication pathway 84 is a CAN bus, and serial digital signals are sent bi-directionally along the CAN bus, as governed by the CAN interfaces integrated into the high-temperature sensor interfaces 81. The common communication pathway 84 communicates sensor data to a controller or monitor 85. The common communication pathway 84 may be any appropriate physical medium such as electrical wires, optical fiber, or wireless transmission. In some embodiments of the present invention, controller 85 is a FADEC. The controller 85 is also capable of communicating instructions and data back to the high-temperature sensor interfaces 81 along the common communication pathway 84.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What we claim is:
1. A sensor network comprising
at least two sensors having analog signals; and
at least two sensor interfaces each comprising
at least one sensor connector for connecting one of the at least two sensors having analog signals;

one or more electrical components capable of operating at temperatures greater than at least 135° C. for analyzing and digitally converting the analog signal of at least one sensor;
a communication device for transmitting the modified and digitally converted signal; and
a common communication pathway for transmitting the modified and digitally converted signals from both of the at least two sensors.

2. The sensor network of claim 1, wherein the electrical components are capable of operating at temperatures greater than at least 200° C.

3. The sensor network of claim 1, wherein the electrical components are capable of operating at temperatures greater than at least 275° C.

4. The sensor network of claim 1, wherein the common communication pathway is a CAN bus.

5. The sensor network of claim 1, wherein the common communication pathway is optical fiber.

6. The sensor network of claim 1, wherein the common communication pathway is a wireless RF link.

7. A sensor network comprising
at least two sensors having analog signals; and
at least two sensor interfaces connected by a common communication pathway, each sensor interface comprising
at least one universal sensor connector for connecting one of the at least two sensors having analog signals or a set of fully integrated connectors capable of connecting to more than one type of sensor;
one or more electrical components capable of reliably operating at temperatures greater than at least 200° C. and vibrations of 60 g's at a frequency of 4,000 Hz for analyzing and digitally converting the analog signal of at least one sensor; and
a communication device for transmitting the modified and digitally converted signal;
wherein the common communication pathway is for transmitting the modified and digitally converted signals from both of the at least two sensors, and the common communication pathway is further connected to a controller or monitor.

8. The sensor network of claim 7, wherein the electrical components are capable of reliably operating at temperatures greater than at least 260° C. and at vibrations of 150 g's at a frequency of 7,500 Hz.

9. The sensor network of claim 7, wherein the controller or monitor is a FADEC.

10. The sensor network of claim 7, wherein the universal sensor connector or set of fully integrated connectors are capable of connecting at least to an LVDT, a resolver, a thermocouple, an engine speed sensor, an airspeed sensor, and an RTD, and a strain gauge.

11. The sensor network of claim 7, wherein the universal sensor connector or set of fully integrated connectors are capable of connecting at least to a vibration sensor, an oil level sensor, and a 2-wire VDT sensor.

12. The sensor network of claim 7, wherein the universal sensor connector or set of fully integrated connectors are capable of connecting at least to a flame-out/light-off detector, an oil debris monitor, and an eddy current sensor.

13. The sensor network of claim 7, wherein at least one of the sensor interfaces is capable of being connected to at least 16 sensors.

* * * * *